Figure 1:
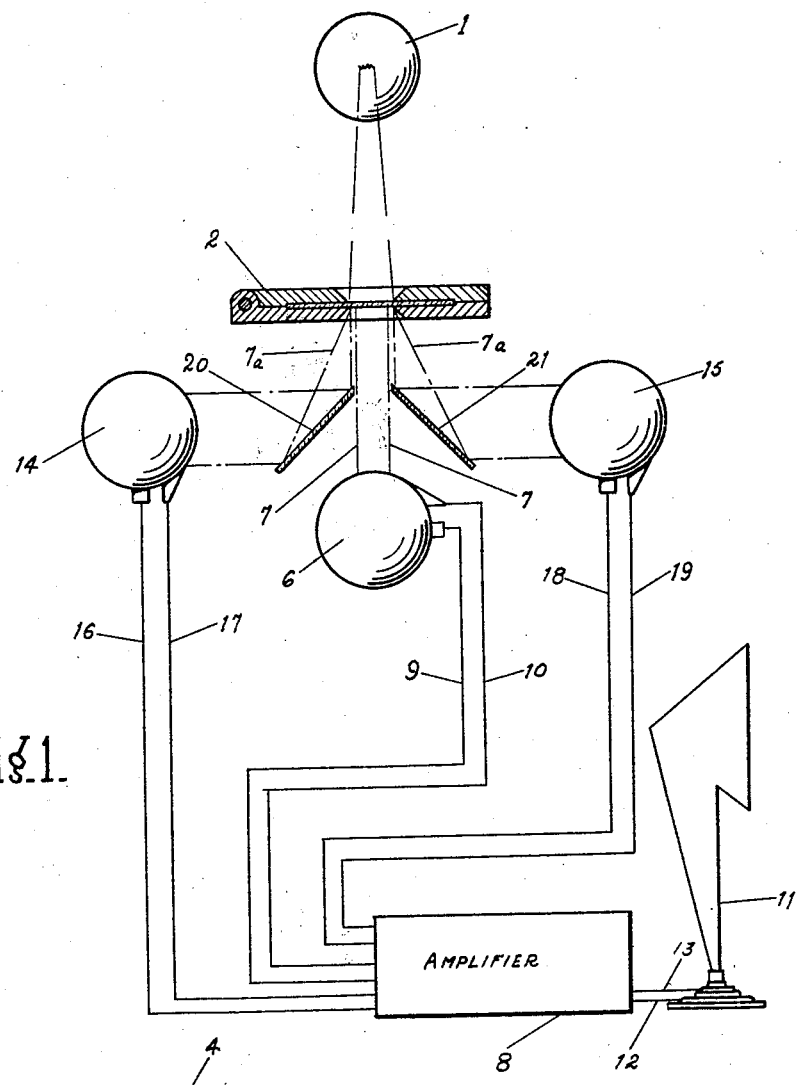

Oct. 6, 1931.   F. H. OWENS   1,826,522

APPARATUS AND METHOD FOR REPRODUCING PHOTOGRAPHIC SOUND RECORDS

Filed March 20, 1929

INVENTOR.
FREEMAN H. OWENS.
BY *Philip S. Hopkins*
ATTORNEY

Patented Oct. 6, 1931

1,826,522

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

APPARATUS AND METHOD FOR REPRODUCING PHOTOGRAPHIC SOUND RECORDS

Application filed March 20, 1929. Serial No. 348,639.

This invention relates to an improved apparatus and method for reproducing photographic sound records, the principal object of the invention being to provide means by which the rays of light from the reproducing lamp ordinarily employed are utilized to maximum efficiency and the volume of the reproduced sound from the film or other record-carrying member is considerably increased.

A further object of the invention is the provision of an apparatus of the character described in which the rays of light after their passage through the film are split up and directed in diverging paths toward a plurality of photo-electric cells, whereby in case of the failure of either of the cells to function the apparatus will continue to operate by means of the rays passing to the remaining cells.

With the foregoing and other objects in view, which will appear as the description proceeds, the invention consists in the novel features of arrangements and combination of parts which will be more fully described hereinafter and particularly pointed out in the claims.

Figure 2:
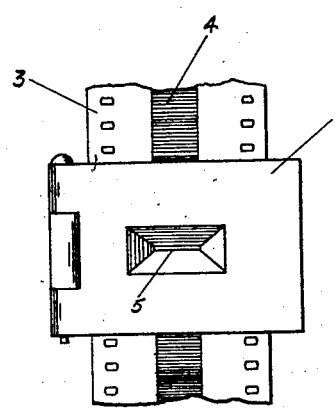

In the drawings accompanying this specification,

Fig. 1 is a partly sectional diagrammatic plan view illustrating an apparatus embodying the features of the present invention; and Fig. 2 is a fragmentary side view of a film record, showing the slit in the supporting gate through which the light rays are projected.

Referring to the drawings, 1 designates the usual reproducing lamp from which the light rays of constant intensity are projected through the well known optical system, not shown, disposed between said lamp and the gate 2 through which passes the traveling film 3 on which the sound modulations have been photographed as indicated at 4, said gate having formed in its front and back walls a slit 5 of narrow width to permit passage of the light rays through the sound record on the film in the usual manner. A photo-electric cell or other light sensitive element 6 is disposed directly in the path of the rays of light 7 after the passage of said rays through the film, the cell 6 being electrically connected with a suitable amplifier by wires 9 and 10, and the amplifier in turn connected with a loud speaker 11 by wires 12 and 13.

As is well known, in apparatus of the character so far described, in which a single photo-electric cell is employed, the modulated rays of light, after passage through the sound record on the film, spread or diverge beyond the slit in the gate as indicated by the lines 7$^a$. I have found that these diverging rays can be utilized to good advantage by intercepting and using them to excite additional photo-electric cells. For this reason, in the apparatus herein illustrated I have provided a plurality of auxiliary photo-electric cells, two being shown herein, designated 14 and 15 respectively. These cells are disposed laterally of the rays of light at a point between their emergence from the film and their entrance into the cell 6, each of the cells 14 and 15 being, like the cell 6, electrically connected with the amplifier by wires 16, 17 and 18, 19 respectively. Between each of the cells 14, 15 and the light rays 7 is disposed a reflecting surface or mirror 20 and 21 respectively, said reflecting surfaces being disposed so as to project into the path of the outermost rays of light and divert said rays directly toward the photo-electric cells 14 and 15 respectively, as indicated by the broken lines 21. As illustrated in the drawings, the converging edges of the mirrors are spaced sufficiently far apart to permit the major portion of the light rays to pass directly to the cell 6, the reflecting surfaces intercepting, as stated, only the outermost of the rays which would pass directly to said cell, together with the diverging rays. I have demonstrated beyond doubt that, by using these intercepted rays for exciting a plurality of auxiliary photo-electric cells, the maximum efficiency of the sound modulated rays of light is obtained and the volume of sound reproduced from the film record is greatly increased.

It will of course be understood that while I have illustrated and described herein only two auxiliary photo-electric cells, any desired number may be employed, and I do not intend to limit my invention either to any specific number of cells nor to the specific location thereof relatively to the principal cell and the rays of light, all of which may be varied without departing from the spirit and scope of the invention as set forth in the claims appended hereto.

Having thus described my invention, what I claim is:

1. Apparatus of the character described comprising, in combination, a film having a photographic sound record thereon, means for projecting light rays through said record, a plurality of means for translating the record-modulated light rays into electric impulses, one of said means being disposed directly in the path of said rays and the others at an angle to said path, means for diverting some of the rays of light toward said angularly disposed translating means, and means for amplifying and rendering audible all of the impulses.

2. Apparatus of the character described comprising, in combination, a film having a photographic sound record thereon, means for projecting light through said record, a photo-electric cell disposed directly in the path of said record-modulated light, a plurality of photo-electric cells disposed about said path, means for diverting some of the rays of light toward said latter cells, a sound amplifier, and electrical connections between said amplifier and all of said photo-electric cells.

3. Apparatus of the character described comprising, in combination, a film having a phtographic sound record thereon, means for projecting light through said record, a photo-electric cell disposed directly in the path of said record-modulated light, a plurality of photo-electric cells disposed about said path, reflecting surfaces projecting into the path of some of the rays of said light and adapted to divert said rays toward said latter cells, a sound amplifier, and electrical connections between said amplifier and all of said photo-electric cells.

In testimony whereof, I affix my signature.

FREEMAN H. OWENS.